Jan. 3, 1967   E. G. SUNDBERG   3,296,028
LEAD STORAGE BATTERY ELECTRODE ALLOY COMPOSITION
Filed July 13, 1964
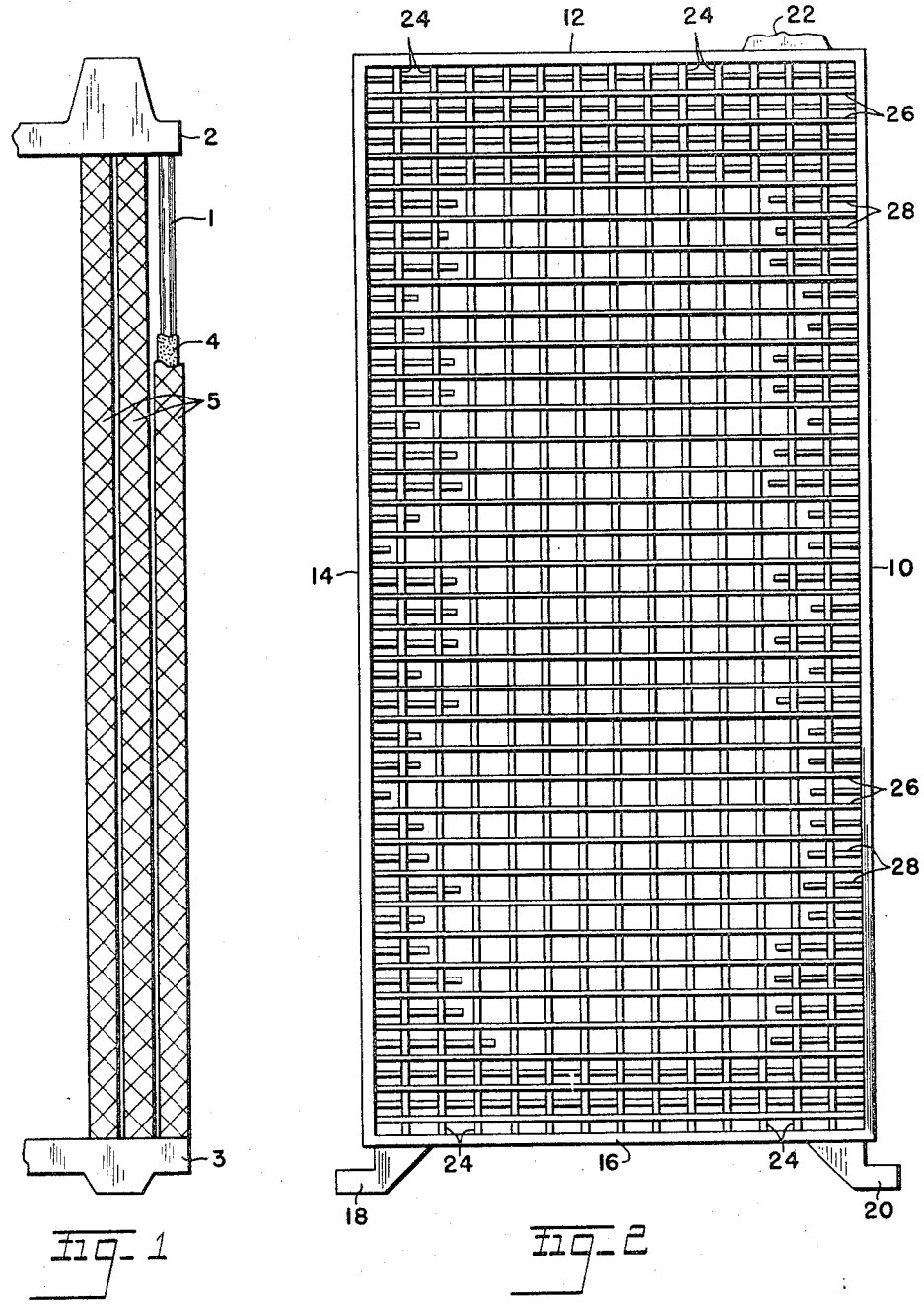
INVENTOR
ERIK GUSTAV SUNDBERG
BY  *Strauch, Nolan & Neale*
ATTORNEY

United States Patent Office 3,296,028
Patented Jan. 3, 1967

3,296,028
LEAD STORAGE BATTERY ELECTRODE
ALLOY COMPOSITION
Erik G. Sundberg, Osbacken, Nol, Sweden, assignor to Aktiebolaget Tudor, Stockholm, Sweden, a corporation of Sweden
Filed July 13, 1964, Ser. No. 382,236
2 Claims. (Cl. 136—65)

The present invention relates to lead storage batteries and concerns in particular an improved lead alloy composition for use as the electrodes.

Electrode grids of the type which are commonly used in lead-acid batteries are generally formed of lead-antimony alloys containing from 4% to 11% antimony plus smaller amounts of other metals such as arsenic, silver, tin, cooper, etc. During the charging and discharging of the battery, the material of the positive electrodes is exposed to electro-chemical attack causing antimony to go into the liquid electrolyte. Antimony can also go into the electrolyte from the negative grid during discharge. Antimony in active metallic form eventually deposits on the surface of the negative electrodes. Precipitation of antimony on the surface of the negative electrode or other current-conducting parts belonging to negative electrodes or electrode groups, causes self-discharge and consequently hydrogen gas evolution, as well as reduced charge voltage in the battery.

In the charging of a negative plate that contains pure lead, the decomposition voltage, that is to say, the voltage at which hydrogen gas is developed, is sufficiently high so that the battery can be fully charged before such hydrogen gas begins to be developed. If, however, there are traces of antimony on the negative plate, this decomposition voltage is decreased and the hydrogen gas evolution is begun long before the paste on the negative plate is fully charged. If the antimony precipitation is sufficiently great, the negative plate cannot be fully charged regardless of how vigorously the charging takes place, because all the current is consumed for depositing hydrogen.

By using pure soft lead in the electrodes, one can get away from the above-mentioned drawbacks. Because of the poor mechanical properties of lead, the mechanical strength and life of the battery are so poor that in practice, the battery cannot be used.

It has been attempted previously to combine the good mechanical properties of antimony lead with the good electro-chemical properties of soft lead by coating antimony lead parts with soft lead, usually by galvanic coating procedures. It has also been attempted to overcome these difficulties by giving the electrode grid a finer grain structure. Certain physical treatment stages are required for this, such as shock cooling of the electrode grid immediately after casing, or a rolling or pressing procedure. The methods tried have not proven to be feasible and have therefore had to be passed by. Among the reasons for this are the refinement of the grain structure achieved did not correspond to the hopes attached to it with regard to corrosion stability, and the process was so costly that the benefits obtained would not justify the expense.

The principal object of the present invention is to produce storage battery cells which can be charged and discharged with practically negligible gas evolution and with insignificant or no self-discharge.

Another object is to provide a novel alloy for use as a lead battery grid rod employing such a small portion of alloying additives the danger that these additives might be able to migrate out in such quantities that the decomposition voltage for the electrolyte is diminished thereby is reduced to an insignificant level.

Yet another object resides in the use of a homogeneous alloy in the various grid rods forming the positive electrodes, and also in the negative grid and in other current-conducting parts, that consists of at least 99.9% by weight of pure lead, no antimony and alloying substances in the amount of at least 0.05% that increase the creep resistance and thereby produce sufficient mechanical strength so that a commercially usable battery can be produced. The alloying substance amounting to at most 0.1% of the grid weight combined, may be constituted primarily of tellurium, with lesser amounts of silver and/or arsenic, molybdenum, platinum, etc., and is characterized by the absence of antimony and increased resistance to creepage.

These and other objects of the invention will become more fully apparent from the claims and from the description as it proceeds in connection with the drawing wherein:

FIGURE 1 shows a part of a conventional tube plate electrode for a storage battery composed of a grid of vertically extending rods of a conductive material; and FIGURE 2 is a front elevation of a grid type battery plate electrode typically used as the negative electrode.

The positive tube plate, of which only a portion is shown in FIGURE 1, may comprise a number of vertical rods 1 which are interconnected by a top bar 2 and a bottom bar 3. Rods 1 and bars 2 and 3 are made of a conductive material, customarily largely of lead in accordance with procedures described above and also below. Each of rods 1 is surrounded by a layer of active material 4 and the active material on each rod is surrounded by a cover 5. This type of electrode is well known and described in greater detail in U.S. Patent No. 2,896,006.

A typical negative plate electrode is illustrated in FIGURE 2 where the grid per se comprises a marginal frame having four members 10, 12, 14 and 16 with bottom support legs 18 and 20, and an upper terminal portion 22 to which several electrodes of the same polarity are connected together in what is referred to as a plate group. The grid may be composed of three groups of angularly related rods. The first group of rods 24 lies substantially at the central plane of the plate with the rods extending vertically between the upper and lower frame members 12 and 16, and conventionally having a width on the order of 0.10 of an inch and a thickness on the order of 0.20 of an inch. Two groups of horizontal rods may be provided. The first group consisting of rods 26 is on one side of vertical rods 24 of the plate and the second group consisting of horizontal rods 28 is on the other side of the vertical rods. Rods 26 and 28 of each of the two groups in the illustrated embodiment are parallel to each other. Rods 24, 26 and 28 are all covered with active material when the grid is pasted.

The present invention pertains to the use of a novel lead alloy to form the rods in the grids which serve as electrodes for a lead-acid storage battery.

In the course of the years, many lead alloys have become known, which frequently meant progress compared to lead-antimony alloys. However, the self-discharge as a result of local element formation could not be prevented and the decomposition voltage and with it the charging voltage could not be raised sufficiently so that charging could be carried out without gas evolution. The small quantities of alloy additives according to the invention have proven to give the lead alloy a sufficiently high mechanical strength for durability for the purpose in question in addition to having improved electro-chemical resistance. With regard to the mechanical durability, this behavior could not be expected by the complete removal of antimony from the alloy based on the known properties of antimony in lead-antimony alloys.

It is known that almost all metals have a lower precipitating potential for hydrogen than pure lead, from which it follows that the purity of the lead determines the highest permitted charging voltage without gas evolution. This in turn means that through use of the present invention, it has become possible to completely charge a storage battery cell without danger that the decomposition voltage is reached. The storage battery cell according to the invention is charged advantageously to 2.4 volts, below which value practically no gas evolution sets in.

Regarding the mechanical durability, it was found that an alloy consisting of traces of arsenic, 0.07% tellurium and 0.007% silver and the balance pure lead has a creep resistance under a load of 0.71 kp./mm.$^2$ of $35.6 \cdot 10^{-4}$ mm./min. compared to $156.0 \cdot 10^{-4}$ mm./min. for soft lead.

The following is a compilation of experimental results with regard to the prolongation at different loads for three different material compositions.

I. Soft lead—100%

| | |
|---|---|
| 0.71 kp./mm.$^2$ | 156. $0 \cdot 10^{-4}$ mm./min. |
| 0.57 | 25.6 |
| 0.50 | 6.25 |
| 0.35 | 0.96 |

II. Soft lead—88.73% and antimony—11.27% (by weight)

| | |
|---|---|
| 0.71 kp./mm.$^2$ | 3.52·$10^{-4}$ mm./min. |
| 0.57 | 2.44 |
| 0.50 | 2.06 |
| 0.35 | 0.98 |

III. Soft lead—99.92+% and Tellurium—0.07%, silver—0.007 and arsenic—trace (no antimony)

| | |
|---|---|
| 0.71 kp./mm.$^2$ | 35.6·$10^{-4}$ mm./min. |
| 0.57 | 5.27 |
| 0.50 | 3.33 |
| 0.35 | 0.8 |

It is evident from Examples I and III of the table that Example III provides an antimony-free lead alloy with good durability properties and increased resistance to creep. The antimony alloy (Example II) in the test series shows, particularly under higher load, significantly better values with regard to tensile strength; however, the loads that occur in battery do not ordinarily reach the higher values, and hence, the amount of creep at loads of up to about 0.57 kp./mm.$^2$ are most significant.

Only in especially long electrodes such as they occur for example in submarine batteries, may particularly high tensile loads arise on the electrode grid. The load due to the inherent weight for grid rods in an electrode even for submarine batteries is only of the order of magnitude of 0.005 kp./mm.$^2$ and the reason for the actually occurring much higher tensile load, which results in a lengthening of the positive plates, therefore, must have other causes. It is known from experience that the electrode grid of soft lead has a much greater lengthening than can be caused by the inherent weight. It appears that the reason for the phenomenon arises from stresses in the lead peroxide layer formed on the grid rods, which give rise to loads of the order of magnitude of 0.4 kp./mm.$^2$. It is evident from the test results of the loads which can enter into consideration in this connection, that the alloy according to the invention is far superior to soft lead and, although while not as resistant to tensile stress as antimony alloys, is still fully sufficient in strength for the purpose in question.

A lead alloy containing 0.065% tellurium, 0.008% silver and 0.009% arsenic the rest lead, showed approximately the same strength properties and extremely good corrosion resistance.

For different batteries intended for different purposes and thus with electrodes working under different conditions, different alloy compositions may prove to be suitable. In addition to the above-mentioned alloying additives, molybdenum and platinum may also be used to increase the creep resistance of the alloy without detracting from the operating characteristics of the battery. These alloying additives should be present in very small quantities comprising at least 0.05% and not over 0.10% so that the resultant alloy consists of at least 99.9% by weight for pure lead.

I claim:

1. A lead acid storage battery electrode comprising an active material and a supporting and current conducting grid composed of rods in contact with said active material, said rods being formed of a homogeneous alloy consisting essentially of about 0.07% by weight tellurium, about 0.007% by weight silver, and the balance pure lead, said alloy having no antimony therein.

2. A lead-acid storage battery electrode comprising an active material and a supporting and current-conducting grid composed of rods in contact with said active material, said rods being formed of a homogeneous alloy consisting essentially of about 0.065% by weight tellurium, about 0.008% by weight silver, about 0.009% by weight arsenic and the balance pure lead, said alloy having no antimony therein.

References Cited by the Examiner

UNITED STATES PATENTS

| | | | |
|---|---|---|---|
| 2,060,533 | 11/1936 | Singleton et al. | 136—65 |
| 2,170,650 | 8/1939 | Bouton et al. | 136—65 |
| 2,499,566 | 3/1950 | Bouton et al. | 75—166 |
| 2,678,340 | 5/1954 | Stoertz | 136—65 |
| 2,690,464 | 9/1954 | Harris | 136—67 |
| 2,820,079 | 1/1958 | Zahn | 136—65 |
| 2,040,078 | 5/1963 | Canfield et al. | 136—65 |
| 3,117,893 | 1/1964 | Sundberg | 136—56 |

WINSTON A. DOUGLAS, *Primary Examiner.*

A. SKAPARS, *Assistant Examiner.*